Dec. 24, 1940.                H. L. WILLIAMS                2,226,363
                         REVERSIBLE FILM MAGAZINE
                          Filed March 5, 1938
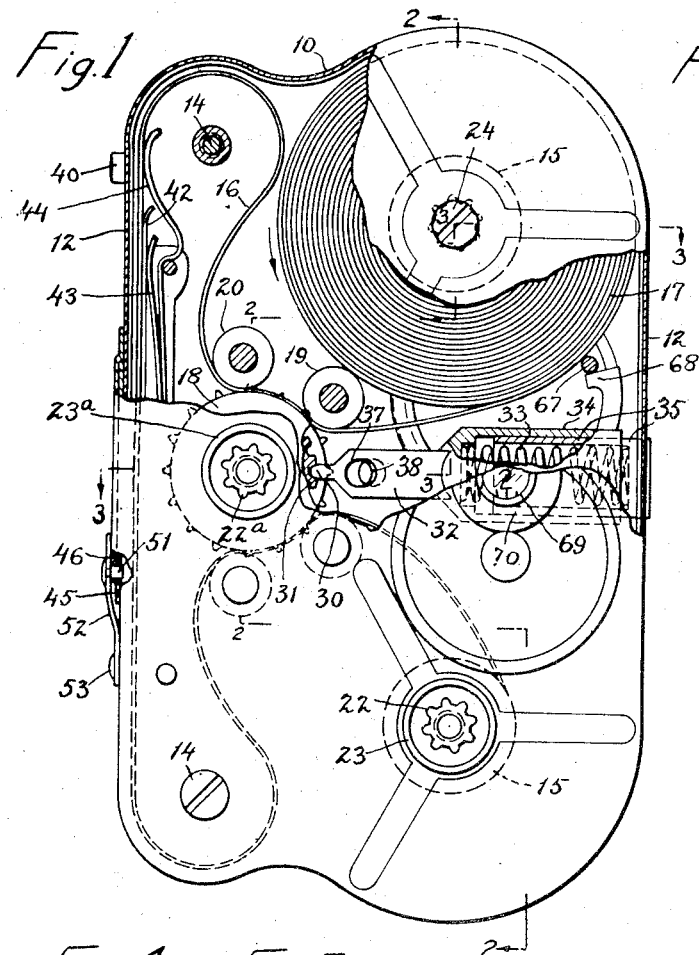
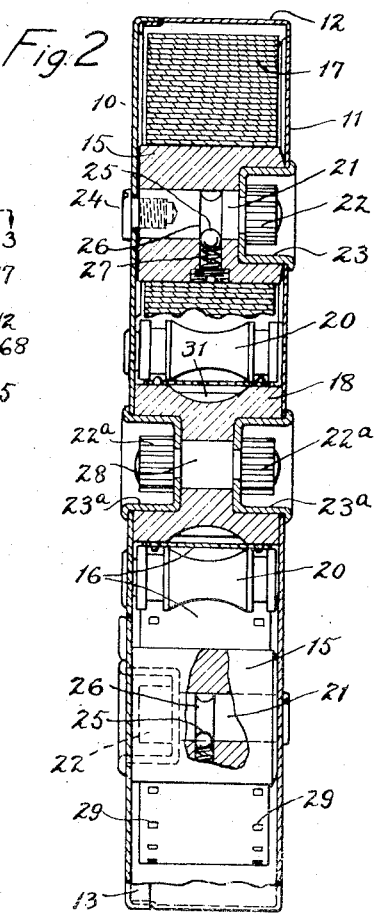
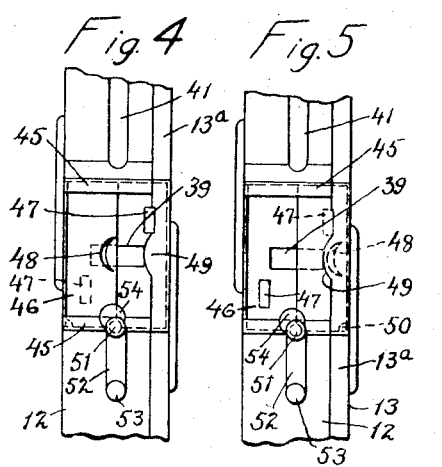
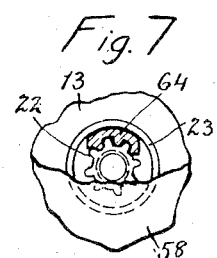
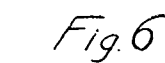
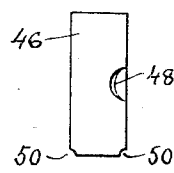
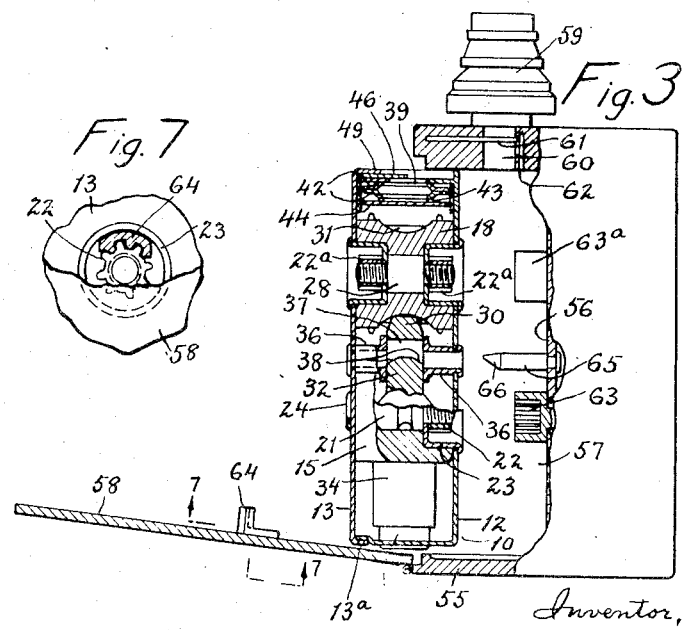
Inventor,
H. L. Williams.
By Robert M. Pierson, Attorney Patented Dec. 24, 1940

2,226,363

UNITED STATES PATENT OFFICE 2,226,363

REVERSIBLE FILM MAGAZINE

Herbert Lloyd Williams, Akron, Ohio

Application March 5, 1938, Serial No. 194,154

3 Claims. (Cl. 88—16)

This invention relates to film magazines for motion picture cameras, and their combination with the camera, and more particularly to the type of amateur camera and magazine which successively takes two rows of pictures on one width of film strip whose length may be comparatively short, such as 25 feet, the double-width film, for example, being 16 millimeters wide and one-half or 8 millimeters being used for each row of pictures.

Heretofore it has been common to recharge the camera for every length of film exposed, either by taking out, turning over and remounting the half-exposed roll to make it ready for the other half to be exposed, or by inserting a fresh unexposed roll. This requires threading of the film through the parts of the camera before any pictures can be taken, and involves the wasting or fogging of several feet of film at each end of the roll, which makes the procedure awkward and troublesome to users and objectionable because of costly wastage.

It is the general object of this invention to provide an improved reversible film magazine adapted, after the exposure of half of the film width, to be turned end-for-end and coupled up in a reverse manner to the driving mechanism of the camera so that the magazine need not be opened and reloaded, except for example at the factory, after the film is fully exposed, thereby avoiding the foregoing difficulties. A particular object is to provide improved film feeder locking means controllable by insertion and removal of the film magazine, as will more fully appear in the detail description. My invention remedies defects in prior devices of this type, which have not come into commercial use, so far as I am aware.

Of the accompanying drawing,

Fig. 1 is a side elevation, partly in section, showing a film magazine embodying my invention in a preferred form.

Fig. 2 is a vertical cross section in offset planes, approximately on the line 2—2—2—2 of Fig. 1.

Fig. 3 is a horizontal section in offset planes, approximately on the line 3—3—3—3 of Fig. 1, through the magazine and opened camera in a partly separated relation.

Fig. 4 is a partial elevation of the exposure edge of a magazine, showing its masking slide in the initial or left-hand position, to permit exposure of the right-hand half of the film strip.

Fig. 5 is a similar view showing said slide shifted to the final or right-hand position, permitting exposure of the left-hand side of the film.

Fig. 6 is a detail elevation of the masking slide.

Fig. 7 is a detail side elevation, partly in section on the line 7—7 of Fig. 3, with camera door closed, showing connected parts of a device, operated by the camera door, for holding stationary the shaft of that roll which is acting as the supply roll, to furnish a drag on the latter during operation.

In the drawing, 10 is the box or casing of the film magazine comprising a back wall 11 and edge walls 12 open on the front side and fitted with a flanged detachable cover 13, these parts being held together by screws 14 in a pair of spacer posts and by coupling members and screws at the ends of the several roll shafts.

Rotatably mounted within the casing are a pair of duplicate rolls, spools or cores 15 for running the film strip 16 into and out of coils such as 17, and the usual intermediate feeding sprocket roll or drum 18, whose teeth enter the perforations in opposite edges of the film strip, together with two pairs of idle film-guiding presser rolls 19, 20, coacting with the surface of the sprocket roll to hold the film in feeding engagement with the latter, said film being permitted to assume the customary form of a pair of loops anterior and posterior to the exposure opening at the left in Fig. 1, and an intermediate straight portion in passing said opening.

The bodies of the spools 15 are mounted on shafts 21, each having at one end a fluted or toothed, positive or jaw male coupling member 22 screwing as a nut on a threaded, reduced end of the shaft as seen in Fig. 3, and a thimble 23 which is rigidly mounted in the adjacent casing wall 11 or 13 and has a bottom fitted to a reduced journal neck on the shaft, said coupling members being at opposite ends of their respective shafts. The end of the shaft opposite to the coupling member is rotatably and detachably held on the adjacent casing wall by the head of a journal screw 24 fitted in the end of the shaft. A driving or a retarding friction, as the case may be, is created between the body of each roll 15 and its shaft 21 by means of a ball 25 occupying a circumferential groove 26 in the shaft and pressed radially inward against the shaft by a spring 27. The body of sprocket roll 18 is fixed on a shaft 28 having at each end a detachable male coupling member 22ª similar to the members 22, located in recessed thimbles 23ª in the opposite casing walls similar to the ones 23.

When the magazine is operatively mounted in the camera, sprocket roll 18 is free to be driven by the spring motor of the camera, but when said magazine is out of the camera, said roll is held from rotation so as to maintain the edge perforations 29 of the film strip in position for registering with the film-feeding claw of the camera by positive interlocking means comprising a blade-like latch tip 30, seen in Figs. 1 and 3, fitting between teeth 31 which are formed in a circumferential row in the waist of the sprocket roll. Tip 30 is formed on the inner end of a plunger stem 32 of square section, forwardly projected by a spring 33. The latter occupies the interior of a cylindrical plunger base 34 and a complemental guide 35 therefor which is fixedly mounted in the back edge-wall 12 of the magazine casing.

The plunger stem 32 works with a light-excluding fit between the inner ends of a pair of aligned guide tubes 36 fixed respectively in the casing back wall 12 and cover 13, and said stem is formed with a transverse through aperture 37 having a double cam retracting surface 38 at the rear side thereof, for coaction with a retracting member on the camera to be later described.

In the front side of the edge wall 12 of the casing is formed an exposure opening 39 of double the width required for a single row of pictures, and immediately in back of it works the usual manual shutter or blind (not fully shown) operated by a button 40 whose stem works in a vertical slot 41. Such operation could be automatically performed by movement of the camera-box door 58 hereinafter referred to, as described in my prior application Ser. No. 180,604, filed Dec. 18, 1937. Back of the opening and slide are the usual pair of guide plates 42 for the film strip, forwardly pressed by a flat spring 43, and back of the latter is a spring plate 44 whose ends act as forward pressers for the film strip adjacent the two loops therein.

On the outer side of the front edge wall 12, above and below the exposure opening 39, are mounted a pair of spaced parallel guides 45 for retaining the upper and lower edges of a laterally movable thin plate or masking slide 46 which blanks off one-half of said exposure opening and the corresponding one of the two feeder claw openings 47. This slide is formed near one edge with a crescent-shaped finger-nail depression 48 for drawing the slide from the position shown in Fig. 4 toward the cover 13, whose flange 13" at that point is spaced from the wall 12 to admit the margin of the slide. The last part of such movement may be completed, if necessary, by the finger nail applied to the left-hand edge of said slide, bringing it into the position represented in Fig. 5. The finger-nail depression 48 is then back of the cover flange 13" which is widened with a lip 49 to complete the coverage. This is in order that the loaded magazine may be sent out from the factory with its slide 46 in the position shown in Fig. 4, and after exposing one-half of the film strip, said slide may be moved to the position shown in Fig. 5 and not thereafter inadvertently moved by the user back to its original position. For retention of the slide 46 in one or the other of its positions, its two lower corners are arcuately notched at 50 to receive the inner end of a latch pin 51 which is carried at the upper end of a spring latch arm 52 whose lower end is riveted at 53 on the casing wall 12. Also at the upper end of arm 52 is a finger-nail tab projection 54 for pulling said end outwardly to release the latch pin when slide 46 is to be moved.

Referring to Figs. 3 and 7, 55 is a camera box containing, on one side thereof, a spring motor 56, and on the other side formed with an adjacent recess 57 for receiving the film magazine, said recess being closed at its front side by a hinged door 58. On the front edge wall of the box is mounted a lens 59 at the outer end of an exposure opening 60 which aligns with the magazine exposure opening 39 and is controlled by an automatic shutter 61. The latter is timed with the film-strip feeding claw 62, and both are operated by the spring motor in the customary manner.

The upper one of the spools 15 in Figs. 1 and 2 operates as the take-up roll, to which is connected the leading end of the film strip from a coil on the lower roll 15. The shaft 21 of said upper roll, frictionally driving the roll body through the ball 25, is driven by the spring motor 56 through a motor shaft having a socketed or female toothed coupling member 63 whose teeth engage with those of the male coupling member 22 on said roll shaft. The inwardly facing one of the coupling members 22ª on the shaft of the sprocket roll 18 likewise engages with a driving female coupling member 63ª on the end of another power shaft of the spring motor. When an exposure is being made and the film strip wound into the coil 17 on the take-up spool 15, overrunning of the film from the lower spool 15, acting as a supply roll, is avoided by holding the shaft 21 of said lower roll from rotation and allowing the ball 25 to impose a frictional drag upon said lower spool. To automatically hold and release said lower shaft by the closing and opening movement of the door 58, the latter is provided with a segment 64 of a female toothed coupling for engaging the teeth of the male coupling 22 adjacent to the magazine cover 13.

For retracting the latch tip 30 from engagement between the teeth 31 of the film feeding sprocket roll 18 when the magazine is inserted in the camera box by a relative movement axially of the magazine rolls, including roll 18, there is provided a pin or post 65, mounted on the wall of the spring motor 56, within the recess 57, in line with the aperture of the inwardly-facing one of the guide tubes 36, and having a pointed cam end 66 for engaging the adjacent cam face 38 on the plunger stem 32 and forcing the latch tip radially away from the teeth.

For informing the user of the footage of unexposed film remaining on his supply roll and preferably also to indicate the type or character of the film, the reversible magazine of this invention requires duplicate indicators mounted on opposite walls of the casing. These may be of any suitable character, as disclosed in a general way, for example, in my prior application Serial No. 180,604, filed Dec. 18, 1937, and partly illustrated herein, the indicator on the far side in Fig. 1 including a feeler arm 67 yieldingly projected against the film coil 17 on the take-up roll. A back stop 68 controls the travel of said feeler. 69 is the window for the indicator of the near side, back of which its numbered dial swings, and surrounding which is an escutcheon 70 adapted to bear a suitable marking or insignia for the type of film in the magazine.

In the use of this invention, the magazine is loaded, preferably at the factory, with an unexposed film strip 16 on the supply spool 15 which is the lower one as viewed in Figs. 1 and 2, threaded over and between various guiding and feeding members 19, 20, 18, 42, 44, and its leading end connected with the upper or take-up spool 15 while latch 30 is retracted, as by a pin through the hole 37, the blind slide controlled by button 40 will be moved down between the film and the exposure opening 39, the masking slide 46 moved over to the left as seen in Fig. 4, the latch 30 released to lock the ratchet roll 18, and the cover 13 closed and fastened by screws 14 and 24 and coupler nuts 22 and 22ª, making the magazine ready for use. Insertion of said magazine in the camera box 55 connects the coupling members 22 and 22ª of the take-up roll 15 and the sprocket roll 18 with the complemental driving members 63, 63ª of the spring motor 56, it causes the cam post 65 to release the latch 30, and, in the usual manner, it registers the feeder claw 62 with the inner one of the openings 47 and the corresponding row of film perforations 29. The camera door 58 may then be closed, locking the shaft 21 of the lower or supply roll 15 by connecting its coupling member 22 with the toothed segment 64 on said door to impose a drag upon the film, and causing the slide operated by button 40 to be automatically withdrawn by the means of my aforesaid prior application, or otherwise, as previously indicated, to uncover the opening 39 and prepare for the taking of pictures.

The camera having thus been made ready for operation, exposures are made on one side of the film in the usual manner. After the full length of film has been run off, causing stoppage of the supply roll attached to its rear end, the camera box is opened, the magazine reversed by turning it end-for-end about a middle horizontal axis as viewed in Fig. 1, and masking slide 46 is moved to the position shown in Fig. 5 after lifting its latch pin 51, and relocked by the latch in that position. The magazine is then reinserted in the box and the latter closed, whereupon the roll which was acting as the supply roll becomes the power-driven take-up roll, and vice versa, and the sprocket roll 18 is driven at its opposite end, thus reversing the travel of the film with relation to the magazine casing and permitting a row of exposures on the remaining half of said film.

It will be evident that my invention avoids the trouble and waste heretofore attendant upon the use of double-width film strip. It is contemplated that the described form of embodiment could be variously modified without departing from the scope of the invention as defined in the claims.

I claim:

1. Photographic apparatus comprising a moving picture camera, a film magazine reversibly mounted therein and having a feeding sprocket, a circumferential series of locking teeth on said sprocket, a retractable latch for engaging said teeth, a pair of guide tubes flanking said latch, and a latch-retracting cam pin on the camera insertible in either of said tubes by the operation of mounting the magazine in the camera.

2. A reversible film magazine for motion picture cameras comprising a casing, a pair of film coil rolls therein, a film feeding sprocket roll in said casing, driving means at opposite ends of the sprocket roll for connection with complemental means on the camera, a latch for holding said sprocket roll against rotation when the magazine is out of the camera, and means exposed for actuation from either side of the magazine for retracting said latch.

3. Photographic apparatus comprising a moving picture camera, a reversible film magazine, means to reversibly support the magazine in the camera, said film magazine including a casing, a film feeding sprocket within said casing, a retractible latch for holding the sprocket against rotation when the magazine is out of the camera, means in the casing for retracting the latch, means to expose said retractible means from either side of the magazine, and a projection on the camera for extending into said exposing means when the magazine is in the camera for actuating said retractible means to release the film sprocket.

HERBERT LLOYD WILLIAMS.